United States Patent
Kennedy et al.

(10) Patent No.: US 6,930,151 B2
(45) Date of Patent: Aug. 16, 2005

(54) STAR BLOCK COPOLYMERS COMPRISING POLYISOBUTYLENE-B-POLYACRYLONITRILE ARMS RADIATING FROM AN AROMATIC CORE

(75) Inventors: Joseph P. Kennedy, Akron, OH (US); Zheng Fang, Somerset, NJ (US); Ahmed F. Moustafa, Dokki (EG)

(73) Assignee: University of Akron, Akron, OH (US)

( * ) Notice: Subject to any disclaimer, the term of this patent is extended or adjusted under 35 U.S.C. 154(b) by 71 days.

(21) Appl. No.: 10/406,372

(22) Filed: Apr. 3, 2003

(65) Prior Publication Data

US 2003/0236354 A1 Dec. 25, 2003

Related U.S. Application Data

(60) Provisional application No. 60/369,939, filed on Apr. 4, 2002.

(51) Int. Cl.$^7$ .............................. C08F 10/10; C08L 25/12
(52) U.S. Cl. ...................... 525/230; 525/294; 526/348.7
(58) Field of Search .................. 525/230, 294; 526/348.7

(56) References Cited

U.S. PATENT DOCUMENTS

| 5,763,548 A | 6/1998 | Matyjaszewski et al. ... 526/135 |
| 6,228,945 B1 * | 5/2001 | Kennedy et al. ............. 525/241 |
| 6,336,966 B1 | 1/2002 | Coca et al. .................. 106/499 |

* cited by examiner

Primary Examiner—James J. Seidleck
Assistant Examiner—Olga Asinovsky
(74) Attorney, Agent, or Firm—Roetzel & Andress; George W. Moxon, II (57) ABSTRACT

Block copolymers and star polymers having copolymer arms of PIB-PAN have been synthesized via living carbocationic polymerization and atom transfer radical polymerization in a methylene chloride/cyclohexanone solvent system.

12 Claims, 4 Drawing Sheets

STAR BLOCK COPOLYMERS COMPRISING POLYISOBUTYLENE-B-POLYACRYLONITRILE ARMS RADIATING FROM AN AROMATIC CORE

This invention claims the benefit of U.S. Provisional Patent Application No. 60/369,939 filed Apr. 4, 2002.

This invention disclosed in this application was at least partially supported by the National Science Foundation under Grant No. 99-88808. The U.S. Government may have certain rights to the invention herein.

TECHNICAL FIELD

This invention relates to star block copolymers, and, more particularly, a method of synthesis of block copolymers and star block polymers containing polyisobutylene and polyacrylonitrile.

BACKGROUND OF THE INVENTION

The synthesis of various multi-arm radial or star polymers has grown in both practical and theoretical interest in a variety of industries. More particularly, the synthesis of well-defined star polymers having a readily determinable, definite number of arms have become increasingly important over the years. Certain star polymers are useful as, inter alia, surfactants, lubricants, rheology modifiers, viscosity modifiers, control agents, coatings and sealants. Others may be used as thermoplastic elastomers for a variety of applications.

To date, there has not been a successful synthesis of a block copolymer or star polymer having at least one polyisobutylene (PIB) block and at least one polyacrylonitrile (PAN) block, that is, a polyisobutylene-block-polyacrylonitrile copolymer, (PIB-b-PAN). Polyisobutylene and polyacrylonitrile are highly incompatible polymers. By incompatible, it is understood that polyisobutylene and polyacrylonitrile have very different thermodynamic properties. For example, polyisobutylene has a glass transition temperature (Tg) of −61.2° C., while polyacrylonitrile has a Tg of +81.3° C. Since polyisobutylene is hydrophobic while polyacrylonitrile is hydrophilic., finding a solvent in which both polymers are soluble is not intuitive. Many non-polar solvents suitable for dissolving polyisobutylene are not suitable for dissolving polyacrylonitrile, anc vice versa. Polyacrylonitrile is such a unique substance, that the polymer is even insoluble in its own monomer, acrylonitrile.

Matyjaszewski, U.S. Pat. No. 5,763,948 teaches atom transfer radical polymerization (ATRP) as a method of synthesizing low polydispersity (Mw/Mn) block copolymers via anionic polymerization. That patent discloses, at least theoretically, the possibility of a copolymer having both acrylonitrile monomers and isobutylene monomers. However no solvent or system of solvents is disclosed therein in which polyisobutylene, polyacrylonitrile and acrylonitrile monomers are simultaneously soluble. Finally, there is no disclosure of how to make a PIB-b-PAN block copolymer inasmuch as there is no appreciation that a specialized solvent is necessary in which to carry out such polymerization.

Hence in light of the absence in the prior art of both (a) a method of synthesizing through ATRP a low polydispersity PIB-b-PAN copolymer, and (b) a suitable solvent in which polyisobutylene and polyacrylonitrile are simultaneously soluble, the need for such a copolymer and such a solvent is evident.

SUMMARY OF THE INVENTION

Thus, it is therefore, an aspect of the present invention to provide a polyisobutylene-polyacrylonitrile block copolymer.

It is another aspect of the present invention to provide a polyisobutylene-polyacrylonitrile star block polymer.

It is yet another aspect of the present invention to provide a solvent system in which polyisobutylene, polyacrylonitrile, and acrylonitrile monomers are simultaneously soluble.

It is still another aspect of the present invention to provide a method of synthesizing the polyisobutylene-polyacrylonitrile copolymers and star block polymers as recited hereinabove.

One or more of these aspects, together with the advantages thereof over the existing art relating to polyisobutylene-based polymers, which shall become apparent from the specification which follows, is accomplished by the invention hereinafter described and claimed.

The present invention provides a block copolymer comprising at least one block of polyisobutylene and at least one block of polyacrylonitrile.

The present invention further provides a block copolymer comprising one block of polyisobutylene, and two blocks of polyacrylonitrile, to form an ABA triblock copolymer.

The present invention still further provides a star polymer comprising a core component selected from the group consisting of a tricumyl group and a calix[n]arene where n=4 to 16. N number of arms are connected to the core component, but where N=3, the core component is a tricumyl group and where N=n, the core component is calix[n]arene. Each arm of the star polymer comprises one polyisobutylene block directly connected to the core component, and one polyacrylonitrile block, connected to the polyisobutylene block.

The present invention also provides a process of synthesizing a star polymer comprising the steps of providing a polyisobutylene macroinitiator having a terminus capable of mediating atom transfer radical polymerization; solubilizing, in a methylene chloride/cyclohexanone solvent, the polyisobutylene macroinitiator and a plurality of acrylonitrile monomers; and atom transfer radical polymerizing the polyisobutylene macroinitiator with the plurality of acrylonitrile monomers in the solvent to form a star polymer having at least three arms. Each arm comprises one polyisobutylene block formed from the polyisobutylene macroinitiator and one polyacrylonitrile block connected to the polyisobutylene block.

The present invention further provides a polyisobutylene-polyacrylonitrile star block polymer comprising the reaction product of a polyisobutylene macroinitiator and a plurality of acrylonitrile monomers in the presence of a copper [I] catalyst, an electron donating ligand and a methylene chloride/cyclohexanone solvent.

It will be appreciated that the term "co-initiator" as used herein, includes Friedel-Crafts acids, including, without limitation, $BCl_3$ and $TiCl_4$, which are well known for use in the living carbocationic polymerization process.

It will be appreciated that the term "macroinitiator" as used herein, includes a halogenated ester of the hydrophobic polymer of interest. For example, if the hydrophobic polymer of interest is PIB, the corresponding macronintiator is $PIB-OCOC(CH_3)_2Br$, polyisobutylene-endcapped bromoisobutyrate, abbreviated PIB-iBB. Similarly, if the hydrophobic polymer of interest is tricumyl-(polyisobutylene)$_3$, abbreviated $\phi[PIB]_3$, then the corresponding macroiniator is $\phi[PIB-OCOC(CH_3)_2Br]$, abbreviated $\phi[PIB-iBB]_3$.

It will be appreciated that unless otherwise noted, molecular weights of species referred to herein may be expressed in per-segment number average molecular weights (Mn). For example, "PIB 6K-b-PAN 1.8K" is a block copolymer having a polyisobutylene block with a molecular weight of 6000 g/mol and a polyacrylonitrile block with a molecular weight of 1800 g/mol. Further, it will be appreciated that the terms "polydispersity," "polydispersity index," "PDI," and "Mw/Mn" are used interchangeably in this disclosure and the claims that follow.

DETAILED DESCRIPTION

Broadly, the present invention is directed toward the production or synthesis of a series of novel compositions of matter. One such composition is a block copolymer comprising one block of polyisobutylene and one block of polyacrylonitrile. Another such composition has a structure comprising a first component, referred to hereinafter as a "core," selected from the group consisting of a tri-substituted aromatic ring, for example a tricumyl group and a calixarene, connected to a plurality of second components, referred to hereinafter as "arms," comprising block copolymers wherein one segment of the copolymer comprises an isobutylene monomer and a second segment of the copolymer includes a different anionically polymerizable monomer such as, for example, acrylonitrile, to provide a star polymer. It will be appreciated that since the core is a tricumyl group or a calixarene, the star polymer composition will have a plurality of polymer arms, actually more than two arms, radially extending therefrom. Hence, the term "star polymer" is used to describe these multi-arm types of compositions.

The overall synthetic strategy for the preparation of all the target star polymers is depicted immediately hereinbelow.

This synthetic strategy consists of four major steps, exemplified by the following: (1) The synthesis of multi-arm star telechelic (PIB) by living carbocationic polymerization (LC⊕Pzn) of isobutylene (IB) followed by termination by allylation to give an allyl-terminated PIB; (2) hydroboration/oxidation to afford —OH termini; (3) Quantitative transformation of the —OH arm termini to —OCOC(CH$_3$)$_2$Br termini to form a macroinitiator, and; (4) living controlled atom transfer radical polymerization (ATRP) of acrylonitrile mediated by the macroinitiator. It will be appreciated that the synthesis of linear diblock [AB] and triblock [ABA] copolymers is also comprehended herein. When the telechelic PIB is a monofunctional macroinitiator, then an AB block copolymer is the result. When the telechelic PB is a difunctional macroinitiator, such as a dicumyl group, then an ABA triblock copolymer is the result.

Synthesis of the block copolymers and star polymers of the present invention may be accomplished by first synthesizing PIB through living carbocationic polymerization (LC⊕Pzn). This carbocationic polymerization can be initiated by the addition of starting monomers, for example a stream of a isobutylene gas, to a Friedel Crafts acid, (e.g., BCl$_3$), an electron donor (e.g., dimethylacetamide (DMA)) and a proton trap (e.g., 2,5-di-tertbutylpyridine (DtBP)). A second Friedel Crafts acid, (e.g., TiCl$_4$,) can then be introduced and the reactor can be cooled and agitated. To quench or terminate the polymerization, a terminating agent, such as methanol, or alllyltrimethylsilane (ATMS) may be added. The carbocationic polymerization and termination is depicted above in step 1. If ATMS is used, the polyisobutylene block is allylated, that is, a —CH$_2$—CH=CH$_2$ group is added, hence terminating the polymerization of polyisobutylene, by the formation of an allyl-terminated polyisobutylene. The allyl-terminated polyisobutylene is then hydroborated and oxidated to form hydroxyl terminated PIB, step 2. The allylation, hydroboration/oxidation, and living cationic polymerization of polyisobutylene is further described in Chen, C., J. Si, and J. Kennedy, "Living Carbocationic Polymerization. XLIX. Two-Stage Living Polymerization of Isobutylene to Di-tert-Chlorine Telechelic Polyisobutylene," J.M.S.-Pure Appl. Chem., A29(8), 669 (1992), the disclosure of which is incorporated herein by reference.

Suitable Friedel Crafts acids for the practice of the present invention include $BCl_3$ and $TiCl_4$. Suitable electron donors include but are not limited to: N,N-dimethylacetamide, (DMA); 1,1,4,7,10,10-hexamethyltriethylenetetramine, HMTETA; N,N,N,',N',N"-pentamethyldiethylenetriamine, (PMDETA); and dipyridyl, (dpy). Most preferred is dipyridyl. Among the preferred electron pair donors suitable for the practice of the present invention are, inter alia, dimethylacetamide (DMA), dimethyl sulfoxide (DMSO), dimethylphthalate (DMP), pyridine and its derivative triethylamine (TEA), with DMA being most preferred. Examples of proton scavengers include 2,2' bipyridyl, di-tert-butylpyridine (DtBP) and its methyl derivatives with 2,2' bipyridyl being most preferred.

Next, a halogenated ester, such as 2-bromoisobutyryl bromide (BiBB) is reacted with the hydroxyl-endcapped polyisobutylene to form a macroinitiator. In particular, the macroinitiator may be synthesized beginning with a hydroxyl endcapped polyisobutylene, for example, a tricumyl (hydroxyl-endcapped polyisobutylene)$_3$ or a calix[n]arene (hydroxyl endcapped polyisobutylene)$_n$ wherein n=4 to 16. This reaction, depicted in step 3 above, is carried out in the presence of an electron donating ligand to form the macrointiator. Finally, the macroinitiator mediates ATRP of acrylonitrile, step 4, resulting in a polyacrylonitrile block added to each polyisobutylene block. The addition of a polyacrylonitrile block to a polyisobutylene block to form a narrow polydispersity polyisobutylene-polyacrylonitrile block copolymer such as $\phi$-(PIB-b-PAN)$_3$ is accomplished through atom transfer radical polymerization (ATRP), which was first discussed in the patent literature in Matyjaszewski, et al, U.S. Pat. No. 5,763,548. ATRP is a living anionic radical polymerization wherein a telechelic macroinitiator, such as $\phi$[PIB-iBB]$_3$, is placed into a solvent containing a catalyst, for example, Cu[I]Br or Cu[I]Cl, and an electron donating agent such 2,2'-bipyridyl, HMTETA, or PMDETA. Upon adding anionically polymerizable monomers, such as AN, to the solution, a polymer block of the anionically polymerizable monomer, such as PAN, begins to grow.

In the final products of the present invention, either a linear block copolymer or a block copolymer is formed. If the star block copolymer is only a three arm star, a tricumyl core is provided where n=4 to 16. If, on the other hand, more than three arms are to be provided, a calix[n]arene core is employed. The polyisobutylene portion of each arm preferably comprises from about 60 to about 99 wt % of the copolymer chain. More preferably, it comprises about 70 to about 80 wt %. In a more preferred embodiment, the polyisobutylene block has a Mn of up to about 7000 g/mol and the polyacrylonitrile block has a Mn of up to about 1800 g/mol. In a more detailed embodiment, the polyisobutylene block has a Mn of from about 4500 g/mol to about 6500 g/mol, and the polyacrylonitrile block has a Mn of from about 900 g/mol to about 1800 g/mol. Depending on the proportion of PIB to PAN, the polymers of the present invention may exhibit a glass transition temperature (Tg) of from about –61° C. to about +81° C. Living carbocationic polymerization and atom radical transfer polymerization are known for producing well defined and uniform molecular weight polymers. Hence, the polymers of the present invention will have Mw/Mn less than about 1.50. Preferably, Mw/Mn is less than about 1.35. Most preferably, Mw/Mn is less than about 1.25.

Synthesis of a composition of matter via the techniques described above results in a diblock copolymer, such as PIB-b-PAN, a triblock copolymer such as PAN-b-PIB-b-PAN, or a star polymer comprising a core component containing a tricumyl group or a calix[n]arene where n=4 to 16, the star polymer having a plurality of arms connected to the core component. With regard to the star polymers, where there are 3 arms, the core component contains a tricumyl group, and where there are more than 3 arms the core component contains a calix[n]arene; with n being to equal the number arms. Each arm comprises one polyisobutylene block directly connected to the core component, while a polyacrylonitrile block is connected to the polyisobutylene block to form a copolymer arm.

It will be appreciated that a calixarene derivative is a multifunctional initiator for the living carbocationic polymerization reaction, and a plurality of arms equal to the number of functional sites on the calixarene may extend from the calixarene, which serves as the core of a star polymer. Thus, where calixarene derivatives are used as initiators, the number of arms, N, will depend upon the number of functional sites, n, in the calixarene product since each one arm may bond to each functional site. It is conventional in the art to refer to the number of functional sites on a calixarene by denoting the product as calix[n]arene where n equals the number of functional sites.

In a similar manner, a tricumyl group is a trifunctional initiator for the living carbocationic polymerization reaction, hence three arms may extend from the tricumyl group, which accordingly serves as the core of a star polymer.

In the present invention, the tert-halo, tert-methoxy, tert-hydroxy, and tert-acetate derivatives of tricumyl groups and calix[n]arenes where n=4 to 16 are preferably used as multifunctional initiators. That is, the multifunctional initiators suitable for use according to the concepts of the present invention are preferably, but not limited to the tert-F, tert-Cl, tert-Br, tert-I, tert-OCH$_3$, tert-OH, and tert-CH$_3$COO$^-$ derivatives of a tricumyl group and the tert-F, tert-Cl, tert-Br, tert-I, tert-OCH$_3$, tert-OH, and tert-CH$_3$COO$^-$ derivatives of calix[n]arene where n=4 to 16:

Hence, in the above calix[n]arene initiator, y=1, n=4 to 16, and R$_1$ is selected from —F, —Cl, —Br, —I, —OCH$_3$, —OH, and CH$_3$COO$^-$. Similarly, in the above tricumyl initiator, R$_2$ is selected from —F, —Cl, —Br, —I, —OCH$_3$, —OH, and CH$_3$COO$^-$. The tert-methoxy, tert-hydroxy, and tert-Cl derivatives of calix[n]arenes where n=4 to 16 are preferred. More preferred are the tert-methoxy, tert-hydroxy, and tert-Cl derivatives of calix[8]arene. Of the three specified derivatives, the tert-methoxy derivative of calix[8]arene is more preferable because it is soluble in polyisobutylene cationic polymerization charges (CH$_3$Cl/hexanes) at –80° C. In general, preferred multifunctional (octafunctional) initiators suitable for use in the present invention are octa-arm calix arene derivatives, such as octa-arm (polyisobutylene-isobutyryl bromide)$_8$, resulting in an octa arm calix[8]arene (polyisobutylene-polyacrylonitrile)$_8$ as the final star block copolymer. Specific preferred examples of multifunctional (octafunctional) initiators suitable for use in the present invention are the tert-methoxy, tert-hydroxy, and tert-Cl derivatives of 5,11,17,23,29,35,41,47-octaacetyl-49,50,51, 52,53,54,55,56-octamethoxycalix[8]arene, namely 5,11,17, 23,29,35,41,47-(2-hydroxypropyl)-49,50,51,52,53,54,55, 56-octamethoxycalix[8]arene and 5,11,17,23,29,35,41,47-(2-methoxypropyl)-49,50,51,52,53,54,55,56-octamethoxycalix [8]arene. An even more preferred core, however, is a tricumyl group. The most preferred core is a tricumyl chloride initiator, i.e., where $R_2$ is —Cl.

The addition of a polyacrylonitrile block to a polyisobutylene block to form a polyisobutylene-polyacrylonitrile block copolymer such as $\phi$-(PIB-b-PAN)$_3$ is possible only through atom transfer radical polymerization (ATRP), which was first discussed in the patent literature in Matyjaszewski, et al, U.S. Pat. No. 5,763,548. While not considered critical in the past, the discovery in the present invention of a suitable solvent medium was a key development for the synthesis of $\phi$-(PIB-b-PAN)$_3$. The challenge was to identify a solvent or solvent system that simultaneously maintains in solution (1) the hydrophobic PIB-based macroinitiator, (2) hydrophilic acrylonitrile monomers, and (3) the growing polyacrylonitrile polymer. Although PAN is a highly polar solid, it is insoluble in its own monomer, and soluble only in a few special solvents. In addition to these solubility demands due to the different polymer moieties, the maintenance of the stability of the active Cu[I] growing center during ATRP is a further critical requirement.

While not being bound by any theory, initial experiments leading to the present invention indicated that various solvents (benzene, toluene, xylene, anisole) and solvent mixtures (toluene/ethylene carbonate; toluene/dimethyl sulphoxide; carbon tetrachloride/ethylene carbonate; tetrahydrofuran/dimethyl formamide), could not be used because polyacrylonitrile is insufficiently soluble in them. Some of these solvents have been found suitable for the ATRP of monomers other than acrylonitrile. They are unusable in the polymerization of the present invention for the additional reason, it is believed, that the catalytic Cu[I] site is unstable during the ATRP of polyacrylonitrile (the brown Cu[I] changes to green Cu[II] indicating oxidation of Cu[I] to Cu[II] in less than one hour).

It has been found that mixtures of methylene chloride ($CH_2Cl_2$) and cyclohexanone (CHO) maintain the catalytic activity of Cu[I] centers and keep the star-block copolymer in solution for a sufficient length of time before precipitation occurs. Polyacrylonitrile segments up to 1800 g/mol have been successfully synthesized using the methods of the present invention. Methylene chloride is a non electron-donating aprotic solvent and a good solvent for the macroinitiator. It has been shown that it stabilizes the Cu[I]-dpy complex for at least 24 hours. However, $CH_2Cl_2$ alone cannot be used for the ATRP of acrylonitrile, because it is a nonsolvent for polyacrylonitrile and its boiling point is too low (40° C.). Cyclohexanone, on the other hand, stabilizes the Cu [I]-dpy complex and has a sufficiently high boiling point (155° C.) for ATRP, but alone, it is a nonsolvent for the macroinitiator.

Gratifyingly, it has been found that mixtures of $CH_2Cl_2$/CHO allow simultaneous solubilization of polyisobutylene, polyacrylonitrile, and acrylonitrile monomers. In general, in accordance with the present invention the ratio of $CH_2Cl_2$ to CHO (vol/vol) may be from about 10:1 to about 1:10. More preferably, this ratio is from about 5:1 to about 1:5. Still more preferably, this ratio is from about 3:1 to about 1:3. Most preferably, this ratio is 1:1 vol/vol $CH_2Cl_2$ to CHO. This solvent system has been used for the synthesis of well defined target three-arm star-block copolymers, such as $\phi$(PIB-b-PAN)$_3$, of limited block molecular weights, up to about 18,000 g/mol for the polyisobutylene block and up to about 1800 g/mol for the polyacrylonitrile block.

In light of the discovery of this solvent system, a new process of synthesizing a star polymer has been accomplished. The method first requires solubilizing, in a methylene chloride/cyclohexanone solvent, a polyisobutylene macroinitiator having a terminus capable of mediating atom transfer radical polymerization and a plurality of acrylonitrile monomers. Once solubilized, atom transfer radical polymerization of the polyisobutylene macroinitiator with the plurality of acrylonitrile monomers in the solvent takes place to form a star polymer having at least three arms. Each arm comprises one polyisobutylene block formed from the polyisobutylene macroinitiator and one polyacrylonitrile block, formed from the polymerization of the acrylonitrile monomers. The polyacrylonitrile block is connected to the polyisobutylene block.

Ligands suitable for use as an electron donor in ATRP include, but are not limited to: DMA (N,N-dimethylacetamide); HMTETA, (1,1,4,7,10,10-hexamethyltriethylenetetramine); PMDETA, (N,N,N',N', N"-pentamethyldiethylenetriamine); and dpy, (dipyridyl). Most preferred is dipyridine.

Thus, it can now be appreciated that a polyisobutylene-polyacrylonitrile star block polymer may be formed by the reaction product of a polyisobutylene macroinitiator and a plurality of acrylonitrile monomers in the presence of a copper [I] catalyst, an electron donating ligand and a methylene chloride/cyclohexanone solvent.

In order to demonstrate practice of the present invention, examples of the synthesis of these novel compositions of matter are provided. It will be understood that the examples are illustrative only and not meant to limit the invention, the scope and spirit of the invention to be measured by the claims hereinbelow.

First, copper [I] bromide (Aldrich, 98%) and copper [I] chloride (Aldrich, 98%) were purified according to Keller et al. Tetrahydrofuran (THF) and $CH_2Cl_2$ were dried by refluxing over calcium hydride and distilled before use. Isobutylene (IB) and methyl chloride (MeCl) (Linde Division, Union Carbide Corp.) Gases were passed through a drying column packed with barium oxide and molecular sieves. n-Hexane (Aldrich) was refluxed over concentrated sulfuric acid for two days, the organic layer was washed with distilled water, dried with $MgSO_4$, stored over $CaH_2$, and distilled under dry $N_2$ before use. Acrylonitrile (Aldrich 99.5%), N,N,N',N',N"-pentamethyldiethylenetriamine (PMDETA) (Aldrich, 99%), 2-bromoisobutyryl bromide (BiBB) (Aldrich, 98%), ethyl 2-bromoisobutyrate (EBiB) (Aldrich, 98%), allyltrimethylsilane (ATMS) (Aldrich, 98%), 9-borabicyclo[3,3,1]nonane (9-BBN) (Aldrich, 0.5M solution in tetrahydrofuran), titanium (IV) chloride (Aldrich, 99.9%), boron trichloride (Union Carbide), 2,6-di-tert-butylpyridine (DtBP) (Aldrich, 97%), 2,2'-bipyridine (Aldrich, 99%), N,N-dimethylacetamide (DMA) (Aldrich, 99%); 1,1,4,7,10,10-hexamethyl-triethylenetetraamine (HMTETA) (97%, Aldrich) chloroform (99.9%, Fisher) and methyl iodide (99.5%, Aldrich) were used as received.

The synthesis of the tricumyl (polyisobutylene-isobutyryl bromide)$_3$ initiator star, $\phi[PIB-OCOC(CH_3)_2Br]_3$ or, more simply, $\phi[PIB-iBB]_3$, began with the living cationic polymerization of isobutylene (IB) mediated by cumyl chloride initiator, an established process. The three arm macroinitiator obtained herein has Mn=18,000 g/mol, and Mw/Mn=1.11.

A typical procedure for the synthesis of PAN by ATRP is as follows: 40 mg Cu[I]Br (0.280×10$^{-3}$ mmol), 140 mg 2,2'-dipyridyl (dpy) (0.9×10$^{-3}$ mmol), 2 mL predistilled acrylonitrile monomer (AN), and 2 mL cyclohexanone (CHO) were placed in a 50 mL Schlenk flask and the flask was tightly sealed with a rubber septum. The charge was degassed three times under vacuum, and flushed with nitrogen. The macroinitiator, φ[PIB-OCOC(CH$_3$)$_2$Br]$_3$ (0.5 g, 27.7×10$^{-3}$ mmol) was dissolved in a mixture of methylene chloride (4 mL) and cyclohexanone (2 mL). The solution was degassed by three freeze-thaw cycles and injected by a syringe into the charge in the Schlenk reactor. The mixture was heated to 60° C. in an oil bath for 24 hrs. The product precipitated from solution during the of polymerization. The final product was filtered, washed several times with methanol, and extracted by hexanes for 24 hrs. After extraction, the product was dried in a vacuum oven at room temperature for 48 hrs.

The molecular weights of PIB were determined by $^1$H NMR spectroscopy using a varian Gemini-300 MHz instrument at ambient temperature.

Solid-state $^{13}$C NMR spectra were obtained by a Varian Unityplus-200 (4.7T) spectrometer with a Doty Scientific Extended VTMAS probe. The sample was packed to a 7 mm silicon nitride rotor with Kel-F end caps and spectra were acquired with 2.2 KHz magic angle spinning speed at 160° C. $^{13}$C chemical shifts were corrected by using hexamethylbenzene ($\delta_{Mc}$=17.3 ppm) as external reference. For purposes of quantitaive, a $^{13}$C spin lattice relaxation measurement was performed to determine the longest $^{13}$C T$_1$ (1.7 sec). The $^{13}$C Bloch decay spectrum was acquired by using 10 sec relaxation delay, 4.6 μs 90° pulse, and 60 KHz decoupling field, with a total experiment time of 7.5 hrs.

Glass transition temperatures (T$_g$) were determined by a Dupont Instrument, Model DSC2910 differential scanning calorimeter. Samples were heated to 150° C. at 10° C./minute to remove thermal history effects and then cooled to -100° C. The heating and cooling cycles were repeated three times and the thermograms were recorded during the third cycle. The thermal stability was studied by a thermogravimetric analyzer (TA instruments Model HI-Res TGA 2950) under N$_2$ by heating samples from ambient to 150° C. at 10° C./min.

DMA spectra were obtained using a dynamic mechanical spectrometer (Advanced Rheometric Expansion System). Copolymer samples were prepared by molding 200 mg of φ(PIB 6K-b-PAN 1.8K)$_3$ between 8 mm diameter parallel plates at 125° C. for 30 minutes. The gap between the plates was 0.5 mm. The spectrometer was equipped with a 200–2000 g.cm dual range force rebalance transducer. The method allows to command a sinusoidal strain at a constant frequency of 1.0 rad/s and 1% strain while taking successive measurements to obtain the temperature dependence of G' and G" in the 30° C. to 300° C. range. The ramp rate was 2.0° C./minute.

Figure 1:
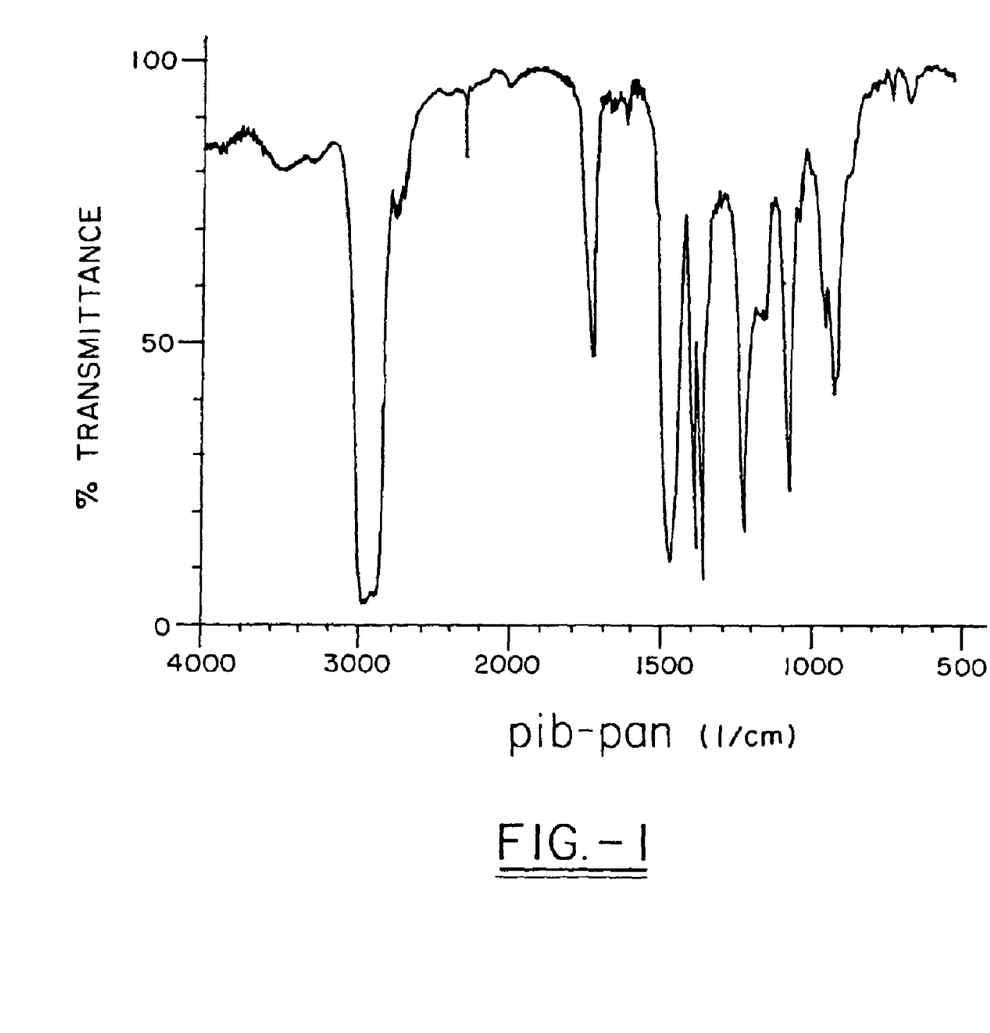
FIG. 1 is a representative FT-IR spectrum of a 3-arm star polymer [φ(PIB 6K-b-PAN 0.106K)$_3$].

FIG. 1 shows the FT-IR spectrum of φ(PIB 6K-b-PAN 0.106K)$_3$. The spectrum shows the characteristic stretches (CH$_3$, CH$_2$) of PIB at 1375 and 1425 cm$^{-1}$ respectively, and the characteristic CN triple bond peak of PAN at 2240 cm$^{-1}$. The prominent peak at 1700 cm$^{-1}$ is attributed to the carbonyl group of the macroinitiator φ-[PIB-(CH$_2$)$_2$CH$_2$OCOC(CH$_3$)$_2$Br]$_3$.

Figure 2:
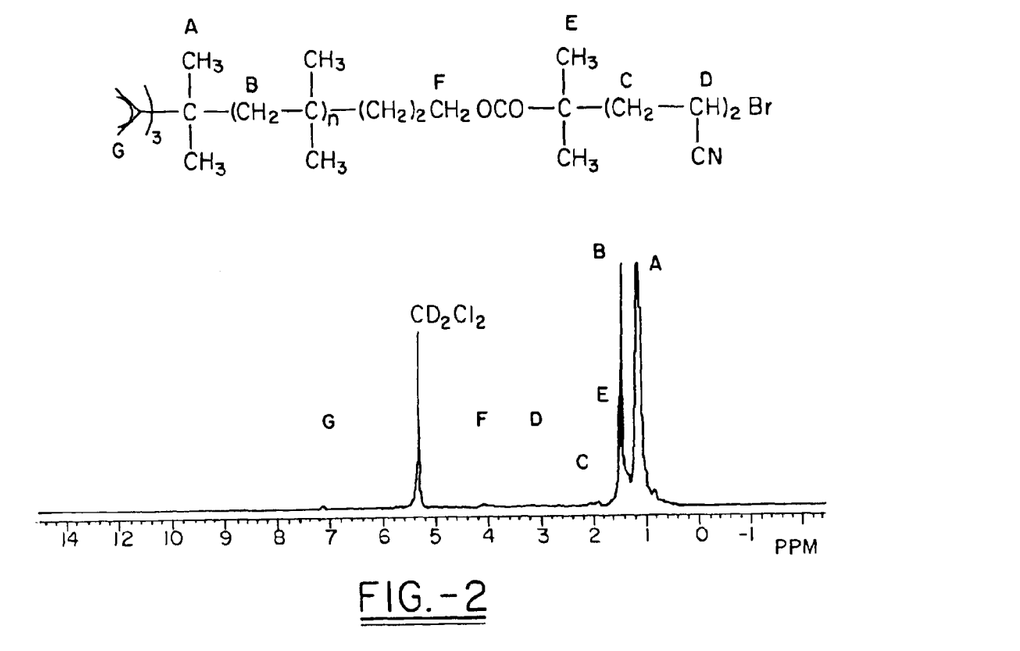
FIG. 2 is a representative $^1$H NMR spectrum of a 3-arm star polymer [φ-(PIB 6K-b-PAN 0.106K)$_3$].

When the molecular weight of the PAN segment is <1000 g/mol, the PIB segment can pull the PAN segment into THF, CH$_2$Cl$_2$, CHCl$_3$ and hexanes solutions. FIG. 2 shows the $^1$H NMR spectrum of φ(PIB 6K-b-PAN 0.106K)$_3$. Integration of the methine proton —CH$_2$—CH(CN)— of the PAN segment at δ=3.15 ppm relative to the three aromatic protons (internal control) at δ=7.19 pp, indicates the presence of two AN units blocked to each PIB arm. When M$_{n, PAN\ block}$>1000 g/mol, φ-(PIB 6K-b-PAN) becomes insoluble in common solvents and $^1$H NMR spectroscopy becomes difficult.

Figure 3:
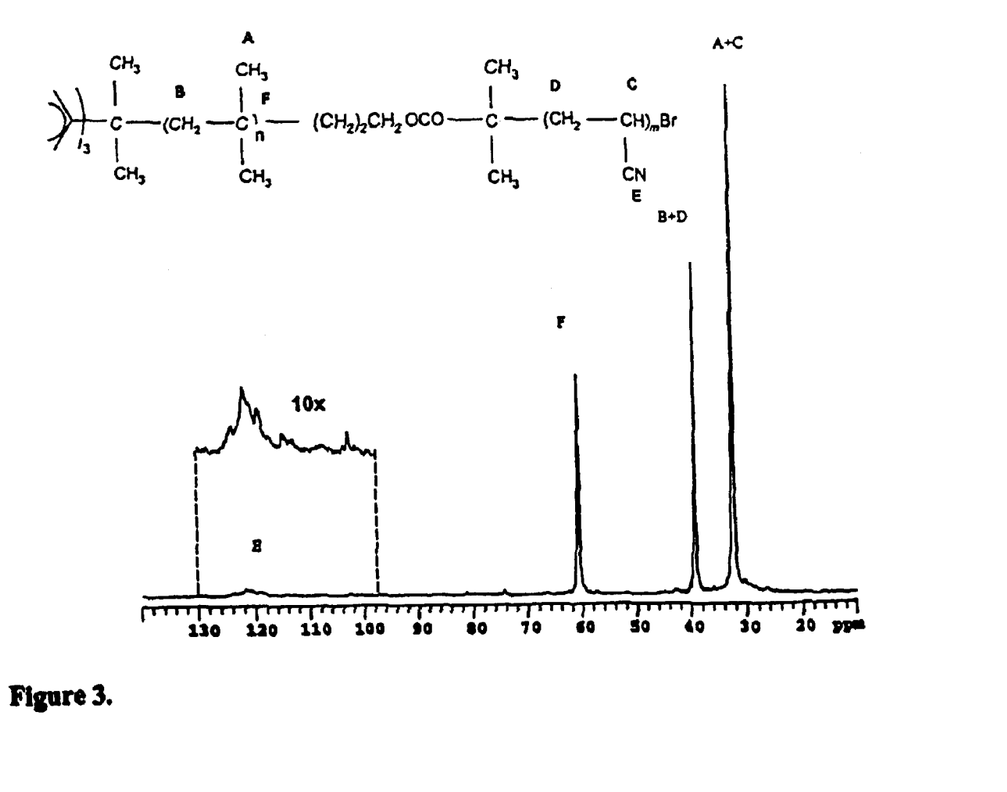
FIG. 3 is a representative solid state $^{13}$C NMR spectrum of a 3-arm star polymer [φ(PIB 6K-b-PAN 1.8K)$_3$].

Due to the insufficient solubility of φ-(PIB-b-PAN)$_3$ in common solvents and consequent difficulty with $^1$H NMR spectroscopy, representative samples with M$_{n, PIB\ block}$>1000 g/mol, were characterized by solid-state $^{13}$C NMR spectrocopy. FIG. 3 shows the spectrum obtained with φ(PIB 6K-b-PAN 1.8K)$_3$. Integration of the CN resonance at δ=120 ppm, relative to the quaternary carbon of PIB at δ=60 ppm indicates block formation and the presence of a star-block of φ(PIB 6K-b-PAN 1.8K)$_3$. Due to the high temperature used, the methine carbons of PAN overlap with the methyl carbons of PIB at δ=31 ppm, and the methylene carbons of PIB and PAN groups appear at 39 ppm.

Figure 4:
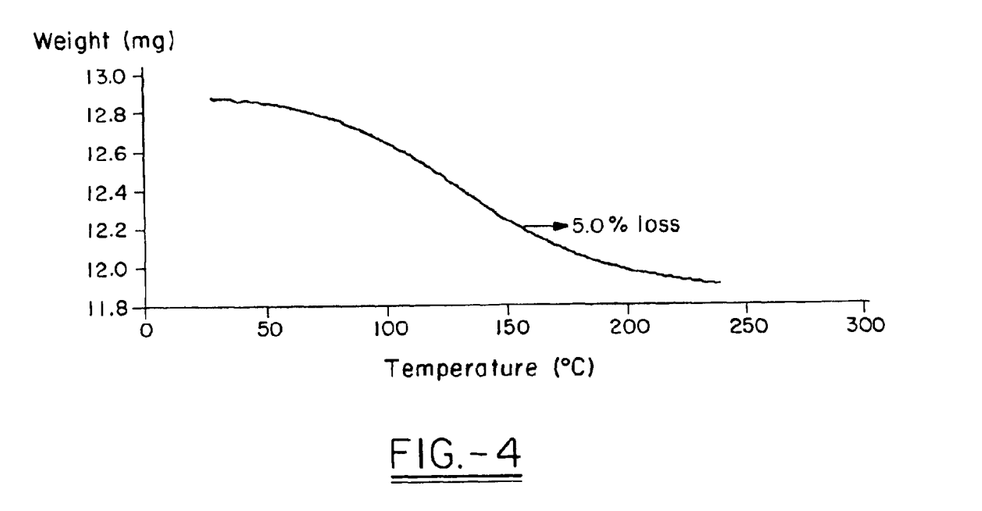
FIG. 4 is a representative Thermogravimetric Analysis (TGA) trace of a 3-arm star polymer [φ-(PIB 6K-b-PAN 1.8K)$_3$].

The thermal stability of φ(PIB 6K-b-PAN 1.8K)$_3$ has been studied by thermogravimetric analysis (TGA) in N$_2$. As shown by the representative thermogram in FIG. 4, this block loses about 5% of its weight at 150° C. Interestingly, the TGA trace indicates smooth thermal degradation, which levels off at about 7% weight loss at about 230° C. This fact together with the observation that the color of the initially white product turns brown during heating suggest extensive thermal cyclization of the PAN block which enhances the thermal stability of the partially degraded star block. The differential scanning calorimetry (DSC) trace (not shown) indicates two T$_g$s (PIB at -61.2° C. and PAN at 81.3° C.), which suggests microphase separation between the PIB and the PAN domains.

Figure 5:
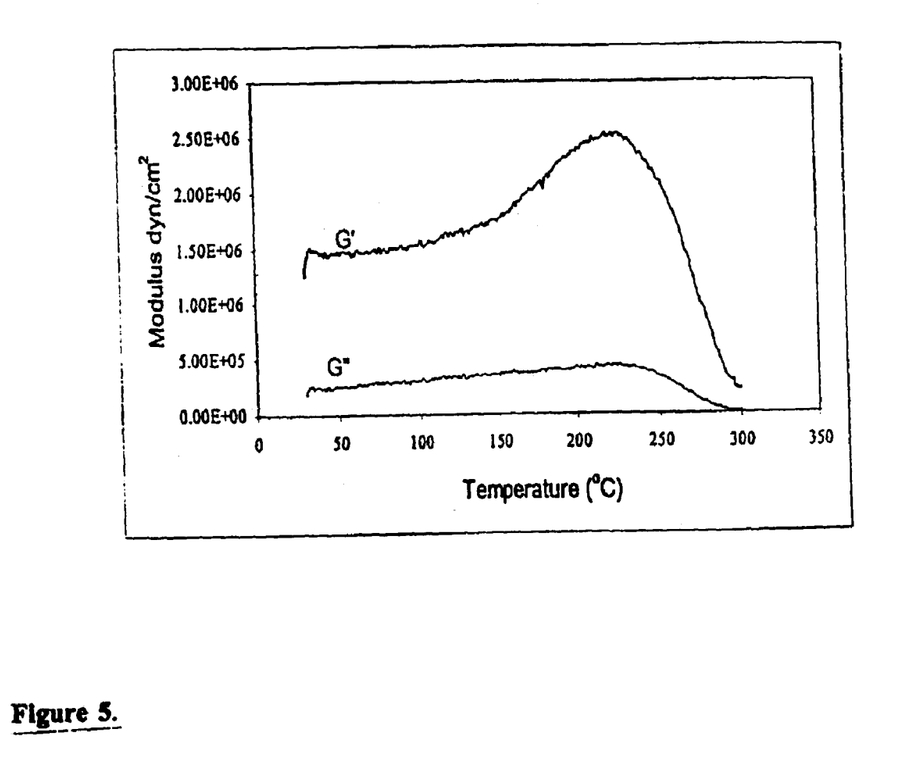
FIG. 5 is a representative graphical depiction of the storage modulus (G') and loss modulus (G") vs. temperature of a 3-arm star polymer [φ-(PIB 6K-b-PAN 1.8K)$_3$].

FIG. 5 shows the storage modulus (G') and loss modulus (G"), as a function of temperature of φ-(PIB 6K-b-PAN 1.8K)$_3$. Both moduli, G' and G", are flat up to about 100° C., however, after this range the mechanical properties (particularly visible by the G' trace) show an unexpected increase. This phenomenon may be due to intermolecular crosslinking mediated by triply bonded —CN groups. The material starts to lose mechanical properties beyond about 250° C. as indicated by the drop in G' and G".

In light of the foregoing, it should thus be evident that the process of the present invention, substantially improves the art of thermoplastic elastomers in general and PIB-b-PAN copolymers in particular. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A star polymer comprising:
    a core component comprising a calix [n]arene where n=4 to 16; and
    4 to 16 arms connected to said core component,
    wherein each arm comprises at least one polyisobutylene block, directly connected to said core component, and at least one polyacrylonitrile block, connected to the polyisobutylene block.

2. The polymer of claim 1, wherein the at least one block of polyisobutylene has a Mn of up to about 7000 g/mol and the at least one block of polyacrylonitrile has a Mn of up to about 1800 g/mol.

3. The polymer of claim 2, wherein the at least one block of polyisobutylene has a Mn of from about 4500 g/mol to about 6500 g/mol and the at least one block of polyacrylonitrile has a Mn of from about 900 g/mol to about 1800 g/mol.

4. The polymer of claim 1 wherein said arms comprise:
   one block of polyisobutylene; and
   two blocks of polyacrylonitrile, to form an ABA triblock copolymer.

5. The polymer of claim 1, wherein the one block of polyisobutylene has a Mn of up to about 7000 g/mol and the two blocks of polyacrylonitrile each have a Mn of up to about 1800 g/mol.

6. The polymer of claim 5, wherein the one block of polyisobutylene has a Mn of from about 4500 g/mol to about 6500 g/mol and the two blocks of polyacrylonitrile each have a Mn of from about 900 g/mol to about 1800 g/mol.

7. The polymer of claim 4, wherein the Mw/Mn of the block copolymer is less than about 1.35.

8. The polymer of claim 4, wherein the Tg of the block copolymer ranges from about −61° C. to about +81° C.

9. The star polymer of matter according to claim 1, the star polymer has eight arms.

10. The polymer of claim 1, wherein the composition is a thermoplastic elastomer.

11. The polymer of claim 1, wherein the composition has a Mw/Mn of less than about 1.35.

12. The polymer of claim 1, wherein the $T_g$ of the composition is from about −61° C. to about +81° C.

* * * * *